United States Patent
McGowan et al.

(10) Patent No.: US 7,127,267 B2
(45) Date of Patent: Oct. 24, 2006

(54) ENHANCED FORWARD LINK POWER CONTROL DURING SOFT HAND-OFF

(75) Inventors: Neil N. McGowan, Stittsville (CA); Hong Ren, Kanata (CA); Ashvin Chheda, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 445 days.

(21) Appl. No.: 10/307,648

(22) Filed: Dec. 2, 2002

(65) Prior Publication Data

US 2004/0106423 A1 Jun. 3, 2004

(51) Int. Cl.
*H04B 7/00* (2006.01)

(52) U.S. Cl. .................. 455/522; 455/436; 455/442; 455/444; 455/69; 455/67.11; 455/524; 370/331; 370/332; 370/333; 370/335; 370/342

(58) Field of Classification Search .............. 455/436, 455/442, 444, 69, 524, 522, 67.11; 370/331, 370/332, 333, 335, 342
See application file for complete search history.

(56) References Cited

U.S. PATENT DOCUMENTS

| | | | |
|---|---|---|---|
| 6,073,025 A | | 6/2000 | Chheda et al. |
| 6,085,108 A | | 7/2000 | Knutsson et al. |
| 6,389,265 B1 | * | 5/2002 | Jeschke et al. ............... 455/69 |
| 6,473,624 B1 | * | 10/2002 | Corbett et al. .............. 455/522 |
| 6,512,925 B1 | * | 1/2003 | Chen et al. ................. 455/442 |
| 6,515,975 B1 | * | 2/2003 | Chheda et al. .............. 370/332 |
| 6,628,958 B1 | * | 9/2003 | Kamel et al. ............... 455/522 |
| 6,708,041 B1 | * | 3/2004 | Butovitsch et al. ......... 455/522 |
| 6,788,685 B1 | * | 9/2004 | Holtzman et al. .......... 370/391 |
| 6,823,193 B1 | * | 11/2004 | Persson et al. ............. 455/522 |

FOREIGN PATENT DOCUMENTS

| | | |
|---|---|---|
| EP | 1 047 207 A | 10/2000 |
| WO | WO 01/47145 A | 6/2001 |

* cited by examiner

*Primary Examiner*—Matthew D. Anderson
*Assistant Examiner*—Sujatha Sharma
(74) *Attorney, Agent, or Firm*—Garlick Harrison & Markison; James A. Harrison; Kevin L. Smith

(57) ABSTRACT

A plurality of base station transceiver subsystems determine whether to scale the forward link transmission power level and, if so, by what amount to control forward link transmission power level mismatch. The plurality of base stations transmit reverse link signal-to-noise ratio information and forward link transmission power levels for a specified transmission to the base station controller. The base station controller compares the reverse link signal-to-noise ratio readings received from each of the plurality of base stations to determine and select a dominant base station. The base station controller then transmits the dominant base station's forward link transmission power level for the specified transmission to each of the plurality of base stations that is communicating with the mobile station that is in hand-off. Each base station, accordingly, determines whether to scale its forward link transmission power level.

7 Claims, 6 Drawing Sheets

ENHANCED FORWARD LINK POWER CONTROL DURING SOFT HAND-OFF

TECHNICAL FIELD OF THE INVENTION

The present invention relates generally to communication systems and particularly to power control and a code division multiple access communication system.

DESCRIPTION OF RELATED ART

The Federal Communications Commission (FCC) governs the use of the radio frequency (RF) spectrum, deciding which industry gets certain frequencies. Since the RF spectrum is limited, only a small portion of the spectrum can be assigned to each industry. The assigned spectrum, therefore, must be used efficiently in order to allow as many frequency users as possible to have access to the spectrum.

Multiple access modulation techniques are some of the most efficient techniques for utilizing the RF spectrum. Examples of such modulation techniques include time division multiple access (TDMA), frequency division multiple access (FDMA), and code division multiple access (CDMA). CDMA modulation employs a spread spectrum technique for the transmission of information. A spread spectrum system uses a modulation technique that spreads a transmitted signal over a wide frequency band. This frequency band is typically substantially wider than the minimum bandwidth required for transmitting the signal. The spread spectrum technique is accomplished by modulating each baseband data signal to be transmitted with a unique wideband spreading code. Using this technique, a signal having the bandwidth of only a few kilohertz can be spread over a bandwidth of more than a megahertz.

A form of frequency diversity is obtained by spreading the transmitted signal over a wide frequency range. Since only 200–300 kHz of a signal is typically affected by a frequency selected fade, the remaining spectrum of the transmitted signal is unaffected. A receiver that receives the spread spectrum signal, therefore, will be affected less by the fade condition. In addition, such a system has good performance in cases where interference may occupy a narrow-band. In a CDMA-type radiotelephone system, multiple signals are transmitted simultaneously at the same frequency. A particular receiver then determines which signal was intended for that receiver by a unique spreading code in the signal. The signals at that frequency, without the particular spreading code intended for the particular receiver, appear as noise to that receiver.

Because CDMA networks employ a system in which all transmissions occur in the same frequency band, it is well known that it is important to transmit at the lowest possible power that allows for the delivery of a communication signal at a certain level of accuracy or grade of service criteria. The reason that it is important for base stations and mobile stations to transmit with a minimal level of power and, on the forward and reverse links, is that each transmission adds to the noise level for all other receivers. In addition, if the per user power on the forward link is minimized there is more power available at the sector power amplifier for other users, thereby increasing the capacity of the system. Similarly, on the reverse link, if less power is used, apart from the interference benefits mentioned above, the mobile station can extend its battery life and/or range of transmission.

Many different approaches have been developed to reduce power transmission levels of base stations and mobile stations. For example, systems have been implemented in which the mobile station initially transmits at an estimated power level that is required to successfully deliver a communications signal. Thereafter, the transmissions between the mobile station and the base station are decreased in power until the signal-to-noise ratio or error rates fall between acceptable levels. Thus, they are adjusted so as to transmit at a power level that delivers communication signals either at a threshold power level or having a threshold error rate. For example, if measured error rates fall below a threshold value, then power transmission levels are increased. On the other hand, if error rates exceed the threshold value, the power transmission level is decreased. Alternatively, if the threshold value is a signal-to-noise value, transmission power levels are adjusted to meet, but not exceed, the threshold value.

Allowing signal quality to degrade will reduce transmission power levels, which reduces noise and interference to other users. However, this is unacceptable from a user's perspective. Improving signal quality beyond a certain point does little to improve the user's perception of quality, but would greatly increase transmission power levels, which, in turn, would increase noise and interference to other users, causing their required power levels to increase in response. Ultimately, system throughput capacity is degraded in this scenario.

While it is important to reduce the transmission power levels without excessively degrading communications, there is an ever present need to continue to find ways to reduce noise and interference among the transceivers while maintaining a certain level of system robustness or efficiency. Accordingly, power control commands in CDMA networks are an important aspect of managing CDMA networks to achieve a balance of competing interests. For this reason also, power control algorithms are complex and sometimes lead to results that are not ideal.

As one example, systems are currently being developed in which base stations are, in theory, able to transmit to the mobile station that is in hand-off from one base station to the other at an equal power level. Thus, as the mobile station generates power up or power down commands on the reverse link, the base stations respond in a similar manner (again, in theory). One problem, however, is that the power control commands generated by the mobile station are not always received error-free by all of the base stations, with which the mobile station is communicating. Thus, the base stations often transmit at different power levels because of missed or erroneously demodulated power control commands. Moreover, this problem can easily result in one base station transmitting at a significantly reduced power level while the mobile station is in a soft hand-off. Thus, the handoff benefit of signal diversity is adversely affected. The other base station(s) would then be required to transmit higher power to account for the diversity loss. This reduces the available power for other users and increases the interference levels in the system. In addition, the maximal-ratio combining algorithm used by the terminal to soft-combine across the handoff paths is detrimentally affected. This algorithm expects the instantaneous transmit pilot to transmit traffic channel power ratio to be the same for each base station link (in handoff) with the mobile. Finally, if a forward link is transmitted at significantly reduced power, i.e. one of the sectors transmitting at very low power, the power control information carried by that link for reverse link power control is corrupted. This ultimately results in reverse link degradation as well. A need exists, therefore, to equalize and determine the power level differences between the base stations to improve power control during soft hand-offs in CDMA networks and to reduce mismatch between base station transceiver subsystems.

BRIEF SUMMARY OF THE INVENTION

Forward link transmission power level mismatch by a plurality of base stations in communication with a mobile station in hand-off is controlled by the present invention in which the plurality of base stations, in communication with the base station controller, each determine whether to scale the forward link transmission power level and, if so, by what amount. More specifically, when the mobile station is in hand-off and is communicating to the plurality of base stations, the plurality of base stations measure reverse link signal-to-noise ratio information reflecting the signal strength of the reverse link from the mobile station in hand-off to the plurality of base stations and transmit the measurement periodically to the base station controller. Additionally, each of the plurality of base stations also transmits their associated forward link transmission power level for a specified transmission time instant to the base station controller. The base station controller compares the reverse link signal-to-noise ratio readings received from each of the plurality of base stations to determine and select a dominant base station. It may be possible to define two or more base stations as dominant if their reverse link signal-to-noise ratio readings are the highest and are approximately the same hereinafter simply referred to as the dominant base station. In this context the dominant base station is the base station that is receiving the most reliable reverse link transmission, which implies that the fast forward link power control feedback transmitted on the reverse link is the most reliable. The most reliable reverse link transmission will be represented by the highest measured signal-to-noise ratio at the base station receiver. The base station controller then transmits the dominant base station's forward link transmission power level for the specified transmission time to each of the plurality of base stations that is communicating with the mobile station that is in hand-off.

Each base station, accordingly, determines whether to scale its current forward link transmission power level based upon a comparison that it performs between its own specified forward link transmission power level at that transmission time and the received forward link transmission power level for the transmission time that was selected for the dominant base station by the base station controller. Accordingly, the invention further includes a specific algorithm for determining the amount of scaling that is to occur and for determining a forward link transmission power level to the mobile station that is in hand-off. The present invention is advantageous in that the amount of mismatch between base stations and the mobile station in hand-off is controlled. Thus, some of the adverse consequences that can occur from severe levels of mismatch are reduced. In general, if there are a number of base stations in handoff with a terminal, the optimal solution would be to transmit forward link signal only on the dominant base station in terms of instantaneous path loss. That is if a determination could be made as to which sector had the best link to the mobile at every instant in time, and the forward link information was then transmitted on that link, the power usage and other resources would be reduced. However, it is not practical to have this information, therefore, it would be advantageous to scale the power between the different base stations in handoff with the terminal, such that the base station that on average would have the better link carries the forward link traffic information with slightly more power than the base stations that on average would have a slightly worse link.

DETAILED DESCRIPTION OF THE INVENTION

Figure 1:
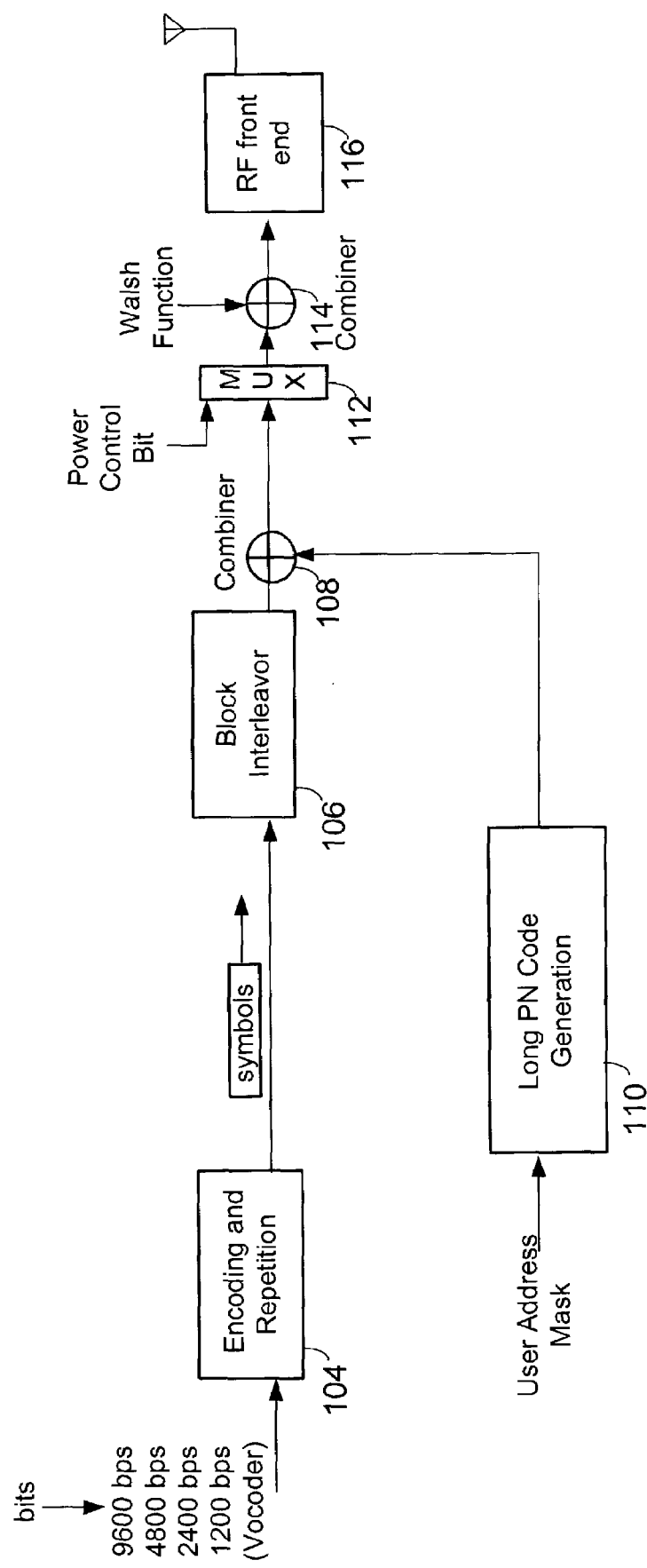
FIG. 1 illustrates a typical CDMA transmitter system for use on a forward link from a base station transceiver subsystem (BTS) to a CDMA mobile station.

FIG. 1 illustrates a typical CDMA transmitter system for use on a forward link from a base station transceiver subsystem (BTS) to a CDMA mobile station. An encoder 104 creates a digital baseband signal by encoding a digitized signal representing an analog voice or digital data service. Encoder 104 accepts data bits in, and produces code symbols at, an output. For each clock cycle, a new data bit is shifted into a register of encoder 104 and the data bit previously received is output. The various inputs of encoder 104 are added (modulo 2) in a predetermined fashion to produce two or more symbols out for each clock cycle. Since the new symbols generated for each clock cycle are derived from the values of the new bit being input in all current data bits occupying the shift register during a given interval, a certain level of predictability can be realized. The output symbols of encoder 104 are then produced to a block interleaver 106. Block interleaver 106 serves to create a matrix of symbols wherein each matrix represents all of the information within a defined interval. For example, in one embodiment, 384 modulation symbols may be entered into an array at a rate of 19,200 symbols per second. The array is then rearranged to create an output array to de-correlate the data and to separate adjacent symbols in time.

One advantage of this process is that the adverse effects of bursty errors may be diminished and information eliminated by the bursty error may potentially be recovered. Moreover, in some embodiments, lower transmission rate data is repeated. Here, the lower rate repeated symbols are also separated therefore increasing the survivability of symbols to signal bit errors. This takes advantage of time diversity. In addition, the data array that is output by block interleaver 106 is slightly modified in that defined power control bits are inserted in place of various data symbols.

The outputs of block interleaver 106 are produced to a combiner 108. Combiner 108 further is coupled to receive, from a long PN code generator 110, long pseudo random number (PN) sequences. Combiner 108 combines the outputs of block interleaver 106 and the long PN sequences to generate user-specific sequences of symbols. The user-specific sequences of symbols are then produced to a multiplexer 112. Multiplexer 112 punctures power control bits into the user-specific sequences of symbols as necessary to deliver power control commands.

The output of multiplexer 112 comprises the stream of symbols that are to be transmitted. Thus, in the described embodiment, the output of multiplexer 112 is then combined with Walsh codes by a combiner 114 to establish the CDMA channels of communication. Thereafter, the output of combiner 114 is produced to radio front-end circuitry where they are converted to analog, up-converted, amplified and radiated as RF signals. The Walsh codes provide ensure that the different users assigned a forward link channel in the same sector are orthogonal to one another. This means that for a particular multipath received at the terminal, the other users from the same sector contribute no interference to the signal intended for the terminal. Then the interference level is determined by signals received from other sectors, and other multipath components.

Figure 2:
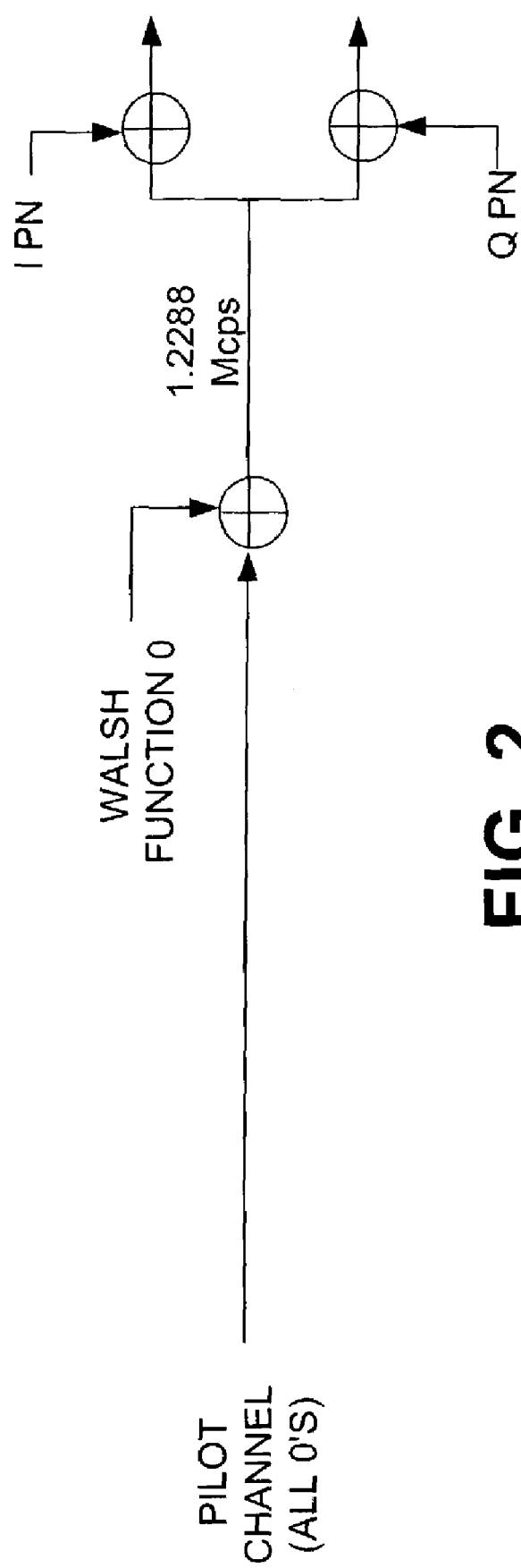
FIG. 2 is a functional block diagram illustrating the operation of a pilot channel.

FIG. 2 is a functional block diagram illustrating the operation of a pilot channel. The pilot channel is a reference channel that mobile stations use for acquisition, timing, and as a phase reference for coherent demodulation. The pilot channel is transmitted at all times by each base station on each active CDMA frequency. Each mobile station continuously tracks the pilot channel. Unlike long code sequences, pilot channel sequences are repeated many times every few seconds. For example, the pilot channel sequence may be repeated 75 times every two seconds in one embodiment. Not only does this aid the mobile station in its initial acquisition when it powers up, but also ensures rapid detection of cells or base station transceiver systems for consideration as hand-off candidate base stations.

All base stations share the same PN sequence for the pilot channel. However, each base station transmits the pilot channel sequences at a unique phase offset value. Thus, the timing of the pilot channel provides tracking of a timing reference for a given base station and phase reference. The phase separation provides for extremely high reuse within one CDMA channel frequency. The uncoded nature of the pilot channel facilitates acquisition by the mobile stations in addition to the short duration of the pilot channel PN sequence.

Figure 3:
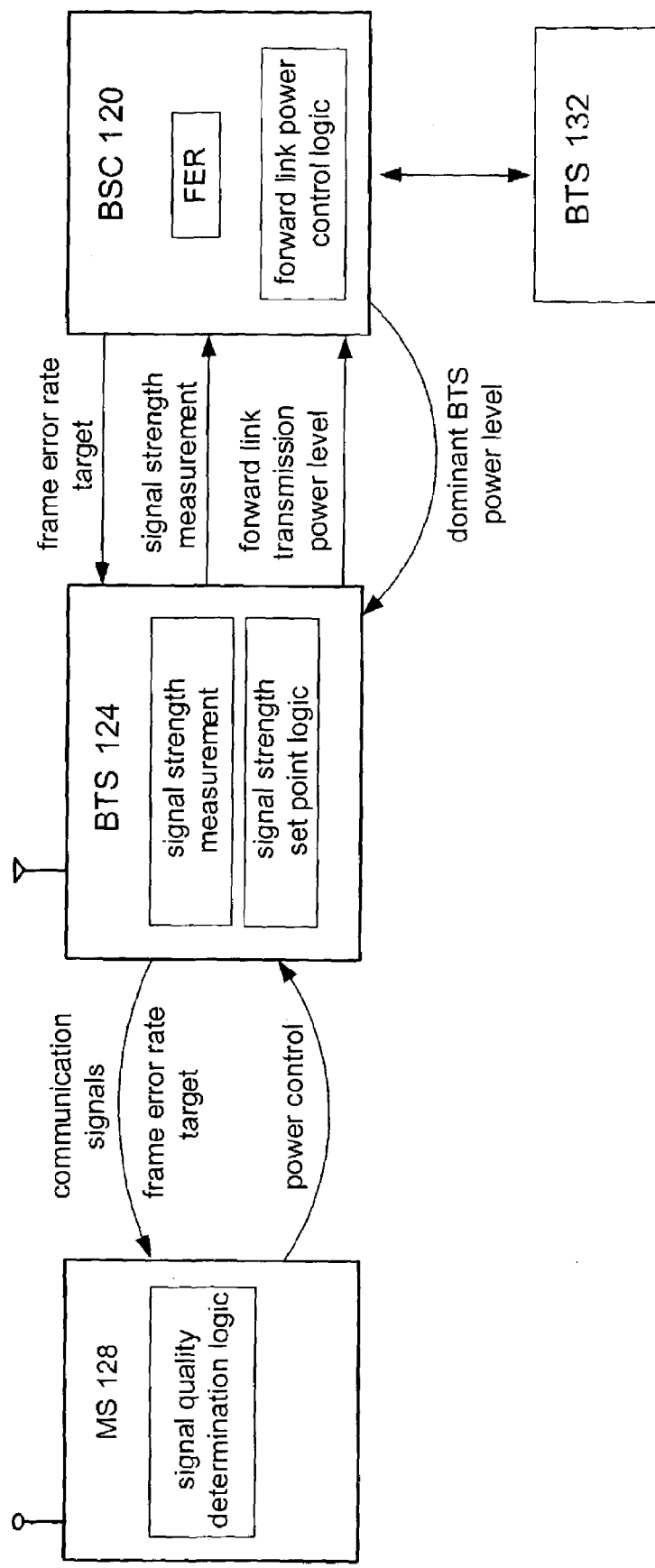
FIG. 3 is a functional block diagram of a partial communication network, including a base station controller, a base station transceiver subsystem and a mobile station operating according to one embodiment of the present invention.

FIG. 3 is a functional block diagram of a partial communication network, including a base station controller (BSC) 120, a base station transceiver subsystem (BTS) 124 and a mobile station 128 operating according to one embodiment of the present invention. Initially, the BSC 120 determines a frame error rate that is to be used to drive power control-related algorithms within the BTS 124 and the mobile station 128.

There are a number of different forms of power control in CDMA networks. These are reverse link open loop power control, reverse link closed loop power control and forward link closed loop power control. The forward link closed loop power control is made up of two modes, an inner loop mode and an outer loop mode. These forms of power control are similar to their reverse link counterparts. In the forward link inner loop power control, the mobile station transmits power control commands at 800 times a second to the BTS(s) to either increase or decrease forward link power. These power control decisions are transmitted in a time-division fashion, along with the reverse link pilot channel. In general, three-fourths of a power control group (1.25 ms) is used for pilot channel symbols, while a fourth of the power control group is used for the power control decision, otherwise known as a power control sub-channel.

A reverse link frame error rate requirement is maintained either at the BSC 120 or the BTS 124. These entities use the frame error rate, whose specific value is typically specified as data-fill by an operator, to run the reverse link power control outer loop algorithm. The forward link frame error rate target, also typically specified in data-fill by the operator, is transmitted to the mobile station 128 during initial traffic channel acquisition in a layer three message. This forward link frame error rate setting is used by mobile station 128 to adjust the target signal-to-noise ratio. This is referred to as outer loop power control by those skilled in the art.

While the described embodiment of the invention includes the base station sending a frame error rate target to the mobile station, there are actually a plurality of methods that can be followed according to the standards for a power control scheme. First, the network can send the initial signal-to-noise (SNR) threshold. Second, the network can send an SNR offset periodically. Here, the mobile station takes an existing SNR threshold it is maintaining and adds offset to it, i.e. adjustment. The network can also send new frame error rate value with which mobile station may use to adjust the SNR threshold. Finally, the network can do nothing apart from sending the FER setpoint at call start up, thereby requiring the mobile station to maintain the SNR threshold itself as function of the FER.

Generally, when a forward link frame is received in error the outer loop SNR threshold is increased by a predetermined value, when the frame is received error free, the outer loop SNR threshold is reduced by a predetermined value. The increase and decrease values are mathematically coupled to achieve the target frame error rate. This mechanism is otherwise known as the outer loop mechanism by those skilled in the art. The SNR thresholds are updated whenever the frame is demodulated, typically every 20 ms for CDMA voice services.

The forward link signal to noise ratio is measured by the mobile station from the forward traffic communication signal transmitted by BTS 124. This signal-to-noise ratio can be measured from the power control bits punctured onto the forward link frame; these power control bits are used for reverse link power control.

The signal-to-noise ratio can also be measured from the actual traffic channel bits as well. The methods are well understood by one skilled in the art. Generally, when the MS 128 is in handoff with BTS 124 and other BTSs, the MS 128 combines the forward link traffic channels meant for it, by the principle of maximal ratio combining as is known by one of average skill in the art. The associated signal-to-noise ratio measurement is determined as the effective signal-to-noise ratio of the signal from all usable multipaths from all BTSs. The signal-to-noise ratio is measured in increments smaller than the frame time. Typically in CDMA2000, the ratio is measured sixteen times a frame. The measured signal-to-noise ratio is compared to the target signal-to-noise ratio. The comparison is used to generate a power control command (800 Hz in CDMA2000) transmitted to BTS 124 and other BTSs in handoff. This is known as inner loop power control by those skilled in the art. Typically, the goal is to generate power down commands as long as the measured signal-to-noise ratio exceeds the target signal-to-noise ratio, and to generate power up commands as long as the measured signal-to-noise ratio is less than the measured signal-to-noise ratio.

In one embodiment of the invention, the BTS(s) on demodulating this terminal transmitted decision will increase or decrease their power by a step accordingly. So in summary, the mobile station estimates the forward link signal-to-noise ratio from the punctured reverse link power control bits, which are always sent at full rate on forward link frames, and compares the estimate to a set-point threshold maintained by the mobile station to generate the up/down commands. The mobile station demodulates the forward link frame and determines if the frame is of sufficient quality to be considered a good frame. Depending on the determination, the target signal-to-noise ratio maintained at the mobile station will be adjusted accordingly to maintain a constant frame error rate (e.g., 2%).

In the described embodiment of the invention, the set-point threshold is a signal-to-noise ratio and is updated by the mobile station 128 based on the frame error rate requirements transmitted by BSC 120 through BTS 124. Mobile station 128 compares the signal-to-noise ratio measured for a received signal to the set-point threshold to determine whether to generate power up or power down commands. Typically, a target frame error rate is approximately 2%. Accordingly, the signal-to-noise ratio threshold is continually adjusted to achieve the 2% frame error rate. Generally, in the described embodiment of the invention, the downward steps to reduce the specified signal-to-noise ratio threshold due to a received good frame are incrementally small compared to an up step to increase the specified signal-to-noise ratio threshold due to a received bad frame. A bad frame is a frame received in error, and is usually indicated by a failed CRC.

More specifically, the signal-to-noise ratio threshold is specified, in the described embodiment of the invention, in what is known as outer loop power control, meaning that the signal-to-noise ratio is specified at a 50 Hz rate in CDMA2000 wireless communication networks. An inner loop power control, which includes the power up and power down commands by the mobile station, occur at an 800 Hz rate in CDMA2000 networks. In one embodiment of the invention, an upward step for the signal-to-noise threshold ratio is typically a 0.5 dB step, while a downward step is significantly smaller and depends on the target frame error rate. In addition, in a usual embodiment of the invention, the power command sent to the BTS by the mobile to power up/down the forward link transmission typically results in ±0.5 dB adjustments.

As may also be seen, BTS 124 also generates forward link communication signals to mobile station 128. Mobile station 128 includes signal quality determination logic that evaluates the signal-to-noise ratio of communication signals being received from BTS 124 and, according to a comparison between a specified signal-to-noise ratio and a determined signal-to-noise ratio, generates power control commands to BTS 124 to request either power up or power down commands, as is known by one of average skill in the art. BTS 124 further includes logic for measuring the signal-to-noise ratio of the reverse link communications from mobile station 128. Accordingly, BTS 124 transmits the measured signal-to-noise ratio to BSC 120. It also generates, for a specified communication, its own forward link transmission power level for the communication signals transmitted to mobile station 128 and generates the time segment for which this transmission power level is valid. BTS 124 generates signal-to-noise ratio measurements and the forward link transmission power levels corresponding to a particular time segment to BSC 120 for mobile station 128 that is in hand-off, meaning that it is also in communication with another BTS, for example, BTS 132. BSC 120 further is in communication with BTS 132, which, as explained already, is communicating with mobile station 128, as is BTS 124, while mobile station 128 is in hand-off. Accordingly, BSC 120 receives signal-to-noise ratio measurements and forward link transmission power level values from both BTS 124 and BTS 132. The data transmitted by BTS 124 and BTS 132 to BSC 120 would in a typical embodiment be transmitted periodically. That is, the reverse signal-to-noise ratio measurements, and associated forward link transmission power levels during a particular time segment are constantly transmitted to BSC 120.

BSC 120 evaluates the reverse link signal-to-noise ratio measurement by each of the BTSs 124 and 132 to determine which BTS received a more reliable signal from mobile station 128. In the described embodiment of the invention, an assumption is made that the BTS receiving the more reliable signal has a smaller path loss to mobile station 128. Accordingly, BSC 120 determines whether BTS 124 or BTS 132 had a stronger reverse link signal-to-noise ratio measurement and determines that that BTS 124 or BTS 132 is the dominant BTS and, accordingly, selects that BTS as the dominant BTS. Thereafter, BSC 120 transmits the selected dominant BTS forward link transmission power level to both BTS 124 and BTS 132 for a specified transmission. BTS 124 and BTS 132 then compare the received BTS power level from BSC 120 during the reported time segment to determine whether it or another BTS is the dominant BTS. It is expected that in a network using this invention would be engineered such that the reporting of forward link transmission power level by BTSs in handoff with a mobile would be reported during the same time segment and with the same period of reporting. This way a reasonable comparison can be made that corresponds to the same time.

The above-described embodiment includes each BTS transmitting the reverse link signal-to-noise ratio measurement to BSC 120 to enable it to determine or select a dominant BTS. In an alternate embodiment of the invention, however, other parameters may be used. For example, the actual geographic distance may be used, in embodiments in which the mobile stations are capable of transmitting their own geographic coordinates to the BTS to enable the BSC (for example, BSC 120) to determine which is the most proximate BTS to the mobile station. Alternatively, in a network that provides for estimation of a mobile station's location, such estimations performed by the BTS in communication with other BTSs or, perhaps, by the BSC, may be used to estimate a mobile station's location to determine which BTS is most proximate to the mobile station and therefore the dominant BTS. For example, if each BTS were to relay angle of arrival information for reverse link communications from the mobile station, BSC 120 in some scenarios, upon receiving the angle of arrival information, would be able to triangulate and approximate a location of the mobile station to determine the most proximate BTS to the mobile station. All these embodiments, however, are alternate embodiments to the present invention. As will be explained in greater detail below, if a BTS determines that it is the dominant BTS as selected by the BSC 120, then it does not adjust its forward link transmission power level. If, however, a BTS determines that it is not the dominant BTS, then it sets its forward link transmission power level to a scaled value as described herein.

Figure 4:
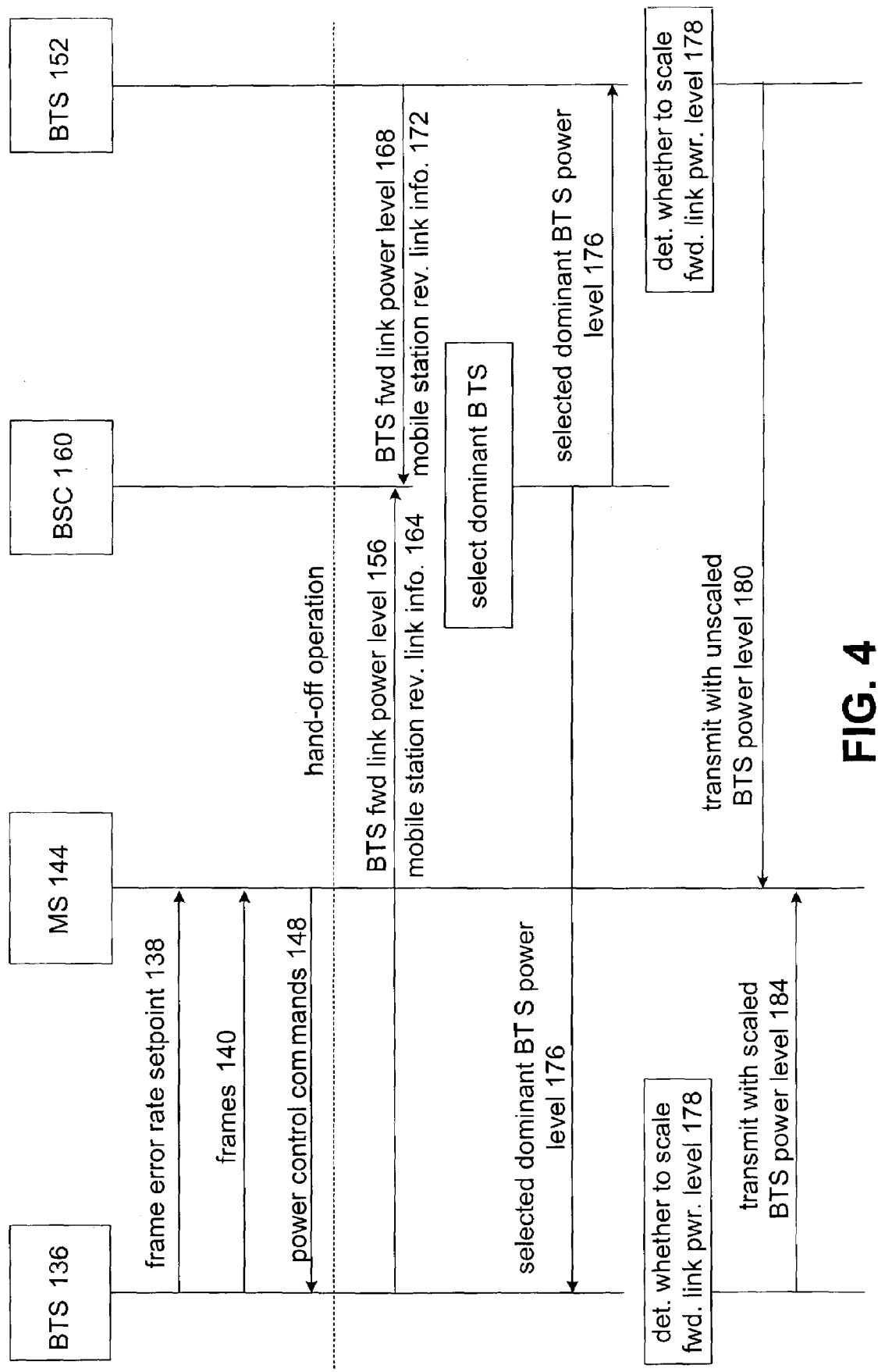
FIG. 4 is a signal sequence diagram that illustrates a partial communication network operating according to one embodiment of the present invention.

FIG. 4 is a signal sequence diagram that illustrates a partial communication network operating according to one embodiment of the present invention. As described before, the signal-to-noise ratio threshold is periodically modified according to the received forward link frame quality. For example, a signal-to-noise value is modified in one embodiment to maintain a 2% frame error rate. A BTS in communication with the mobile station 144, for example, BTS 136, transmits frames 140 to a mobile station 144. The mobile station 144 measures the signal-to-noise ratio from the frames 140 and compares to the signal-to-noise threshold to determine whether to generate power up or power down control commands 148. As may be seen, mobile station 144 generates power control commands 148 to BTS 136. As mobile station 144 transitions towards another cell, it begins to communicate with a second BTS (for example, BTS 152) to transition into a hand-off mode of operation. BTS 136 is currently transmitting BTS forward link power level 156 to BSC 160. BTS 136 further generates mobile station reverse link information signals 164 that it transmits to BSC 160. The two signals, BTS forward link power level 156 and mobile station reverse link information 164, may be transmitted either jointly or separately and, in the described embodiment, are transmitted periodically regardless of whether the mobile station is in a hand-off mode of operation. In an alternate embodiment, these signals are only transmitted once the mobile station or the BSC advise the BTS(s) that the mobile station is in hand-off.

Similarly, BTS 152 generates and transmits BTS forward link power level 168 and mobile station reverse link information 172 to BSC 160. Once BSC 160 has received BTS forward link power level 156 and 168 from BTS 136 and BTS 152, respectively, which should be associated to the same transmission time interval, as well as having received mobile station reverse link information 164 and 172 from BTS 136 and BTS 152, respectively, BSC 160 selects a dominant BTS, for example, BTS 152. After selecting the dominant BTS, BSC 160 transmits the received BTS forward link power level 168 that was received from the selected dominant BTS 152 to each of the BTSs 136 and 152 that are in communication with mobile station 144 during hand-off. BTS 136, upon receiving the selected dominant BTS power level 152, determines whether to scale its current forward link power level 178.

Similarly, BTS 152 determines whether to scale its current forward link power level 178 when it receives the selected dominant BTS power level 152. As has been described already, the determination as to whether to scale the forward link power level 178 includes determining whether the selected dominant BTS power level value is the BTS power level value for a forward link transmission that it had reported to BSC 160 at the corresponding time. If it is the same, the BTS does not scale its forward link power level. Thus, in this example, because BTS 152 is the selected dominant BTS, BTS 152 transmits to mobile station 144 with an unsealed BTS power level 178.

BTS 136, on the other hand, after determining whether to scale the forward link power level in the manner similar to that of BTS 152, transmits forward link communication signals to mobile station 144 with a scaled BTS power level 184. More specifically, BTS 136 determined, after comparing the received selected dominant BTS power level 152 to a corresponding BTS power level transmission value 156, that its power level is not that of the selected or dominant BTS. Accordingly, BTS 136 scales its forward link BTS power level.

In a typical embodiment, this synchronization and scaling procedure would occur on the order of 50 Hz, a rate similar to outer loop power control. The actual fast power control of 800 Hz, or inner loop power control, occurs on top of these synchronization adjustments.

Figure 5:
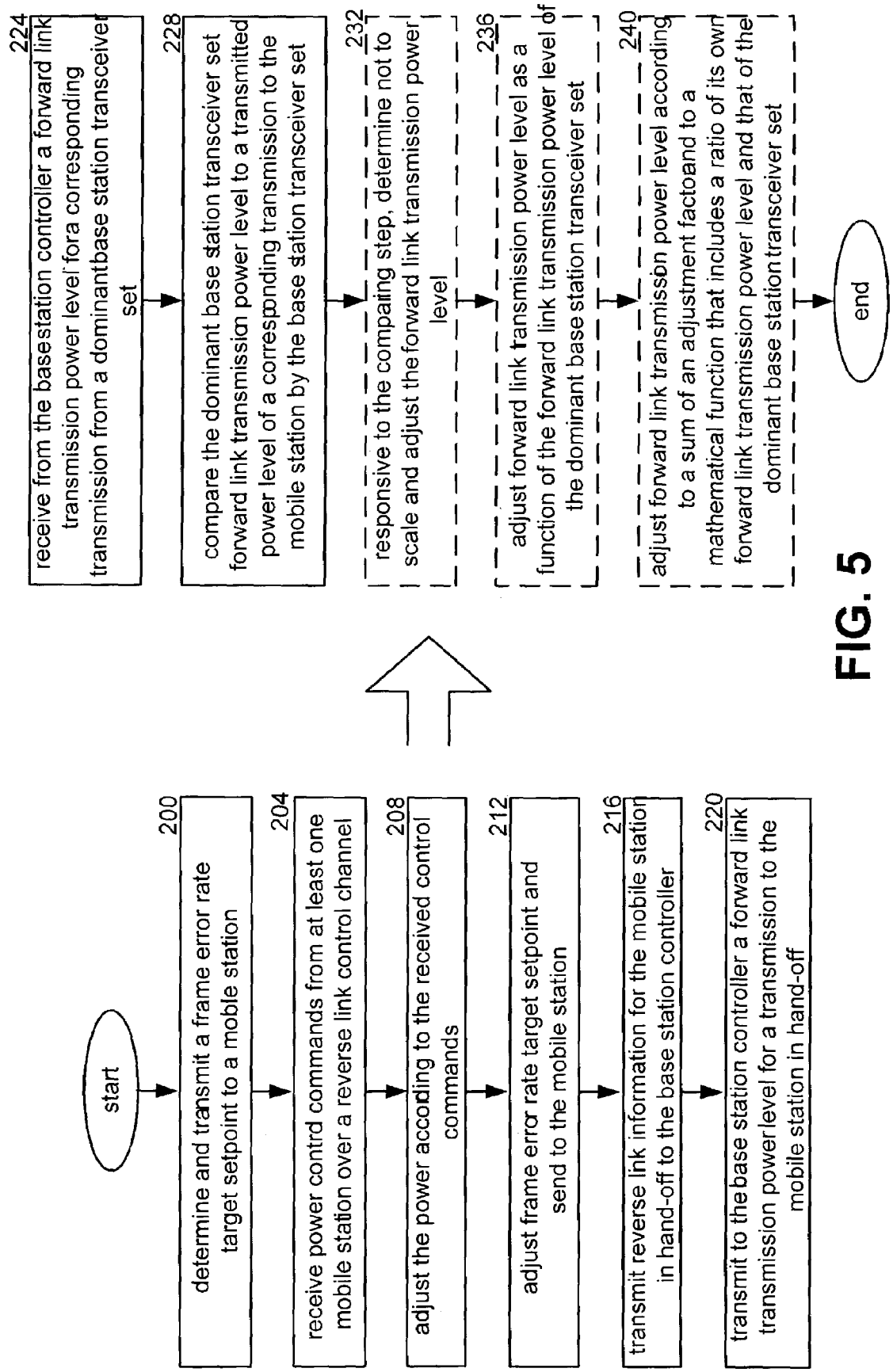
FIG. 5 is a flowchart illustrating one method of the present invention.

FIG. 5 is a flowchart illustrating one method of the present invention. Initially, a base station controller (BSC) transmits a FER set point to the mobile station, via the BTS (step 200). An initial signal-to-noise threshold value can also be transmitted to the mobile station via the BTS. The mobile station will determine and/or adjust the signal-to-noise threshold value based on the quality of the forward link frames received. Thereafter, the BTS receives reverse link power control commands from at least one mobile station over a reverse link control channel (step 204). The operation of steps 200 and 204 are typical outer and inner loop power control steps, as is known by one of average skill in the art.

In general, the mobile station measures the received forward link signal-to-noise ratio and compares to the signal-to-noise ratio target maintained as a function of the frame error rate and generates power up and power down commands in a CDMA network to based on the comparison. Typically, the power up/down commands are sent multiple times a frame; in CDMA2000 this is sent 16 times a frame or at 800 Hz. In this particular embodiment, a signal-to-noise threshold is being used although other thresholds may be used in its place.

Accordingly, when the BTS receives the reverse link power control commands from the at least one mobile station, it adjusts its forward link transmission power according to the received control commands (step 208). The mobile station adjusts the signal-to-noise threshold value after demodulating the forward link frame. The signal-to-noise threshold value is adjusted according to any one of a plurality of different factors. In general, the signal-to-noise threshold value is adjusted to maintain a specified signal quality (e.g., a 2% frame error rate). It is understood that the signal quality metric may be any other metric known by one of average skill in the art, including bit error rate. The threshold value if based on the frame quality alone is updated on the order of the frame time. That is if the frame duration is 20 ms, the threshold value is updated every 20 ms or at 50 Hz, once the determination is made whether or not the frame is received in error or not. Additionally, if necessary the BTS adjusts the frame error rate target (step 212). The BTS transmits reverse link information for the mobile station that is in hand-off to the base station controller (step 216). The reverse link information can be one of a plurality of reverse link signal quality indicators, including signal strength, reverse link signal-to-noise ratio, reverse link frame error rates, etc. The BTS further transmits a forward link transmission power level for a specified transmission time to the mobile station that is in hand-off to the base station controller (step 220). Generally, each BTS in communication with the mobile station while it is in hand-off will transmit to the BSC its forward link transmission power level for a specified communication to the mobile station, as well as the reverse link information from the transmission signals received from the mobile station. Thereafter, the BTS receives, from the base station controller, a forward link transmission power level used by a BTS for a corresponding transmission to the mobile station (step 224).

As has been described already, the base station controller receives the forward link transmission power level from each BTS, as well as the reverse link information from each BTS, to determine which BTS is a dominant BTS. Accordingly, the base station controller generates the dominant BTS' forward link transmission power level to each BTS that is in communication with the mobile station that is in hand-off. Thereafter, each BTS, performing the method of FIG. 5, compares the received BTS forward link transmission power level to a corresponding forward link transmission power level to the mobile station (step 228).

If the comparison is favorable, the BTS does not scale or adjust its forward link transmission power level in response to receiving the forward link transmission power level for the BTS from the base station controller. In the preferred embodiment, the dominant BTS should detect that the values compared are equal and has the same time index. This is because the network, if engineered appropriately, will ensure the BTS(s) are sending the data to the BSC at the same time increment and logging the time increment and data sent. Consequently, on receiving back forward link information from the BSC with an appropriate frame time index or time stamp, the BTS(s) can determine by comparing their stored forward gain values at that time stamp to the BSC feedback value if it is the dominant one. Thus, the BTS determines to not adjust its forward link transmission power level (step 232). If the received BTS forward link transmission power level does not compare favorably, the BTS adjusts its forward link transmission power level as a function of the forward link transmission power level of the dominant BTS for which it received a forward link transmission power level value (step 236).

In one embodiment of the invention, the BTS adjusts its forward link transmission power level according to a sum of a power adjustment factor and to a mathematical function that includes a ratio of the forward link transmission power level of the BTS and the dominant BTS for which it received a forward link transmission power level (step 240). In yet another embodiment of the present invention, the BTS adjusts its power down according to the following formula:

{Adjustment factor+(specified slope factor)*10*(Log [(*BTS* power level)/(dominant *BTS* power level)]}/delay Where delay is the number of frames (20 msec per frame) of delay between sending a BTS' forward link transmission power level to the BSC and receiving the dominant BTS' forward link transmission power level back to the BTS. If the formula returns a positive value, this would be the amount in dB required for the BTS to power down. If the formula returns a negative value, this would be the amount in dB required for the BTS to power up. Under steady state conditions the formula tends to synchronize the non-dominant BTSs to the dominant BTS with a power offset that is equal to:

−(Adjustment factor)/(slope factor)

In the described embodiment of the invention, the power adjustment factor is measured in decibels (dB). Typical example values for the power adjustment factor and the slope are 1.0 dB and 0.4, respectively. This implies that the algorithm tends to power control synchronize the non dominant BTSs such that they are 2.5 dB less in transmission power than the dominant BTS. In simulation for the present invention, the power adjustment values ranged from 0.8 dB to 2.0 dB, although some values were used outside of this range for the power adjustment factor. The slope values in one embodiment range from 0.2 to 1.0, although, again, values outside of this range could readily be used. In general, using the above-referenced formula for scaling the forward link transmission power level for a non-dominant BTS controls the amount of mismatch that can occur in the forward link transmission power levels between BTSs for the mobile station that is in hand-off. The second advantage of this method is that while the mismatch is controlled, an offset in power is purposely created between the dominant BTS and other BTSs in handoff with the mobile. This mismatch is desirable because the overall system power required by all the BTSs involved in soft handoff with the mobile is reduced. In theory, if the BTS with the best link is known, then all the power can be transmitted on this, with nothing transmitted on the other links. This would result in the least power used by the system. However, given that the links fade independently and there is inherent communication delay between the various nodes in a wireless network, a more realistic solution is to transmit less power of links that are indicated with some reliability to have more loss than a dominant link. Hence, this invention achieves synchronization with offset.

Forward link transmission power level mismatch by a plurality of base stations in communication with a mobile station in hand-off is controlled by the present invention in which the plurality of base stations, in communication with the base station controller, determine whether to scale the forward link transmission power level and, if so, by what amount. More specifically, when the mobile station is in hand-off and is communicating to the plurality of base stations, the plurality of base stations transmit reverse link signal-to-noise ratio information reflecting the signal strength of the reverse link from the mobile station in hand-off to the plurality of base stations to the base station controller. Additionally, the plurality of base stations also transmits a forward link transmission power level for a specified transmission to the base station controller. The base station controller compares the reverse link signal-to-noise ratio readings received from each of the plurality of base stations to determine and select a dominant base station.

The base station controller then transmits the dominant base station's forward link transmission power level for the specified transmission to each of the plurality of base stations that is communicating with the mobile station that is in hand-off. Each base station, accordingly, determines whether to scale its forward link transmission power level based upon a comparison that it performs between its own specified forward link transmission power level transmission and the received forward link transmission power level for the transmission that was selected for the dominant base station by the base station controller. Accordingly, the invention further includes a specific algorithm for determining the amount of scaling that is to occur and for determining a forward link transmission power level to the mobile station that is in hand-off. The present invention is advantageous in that the amount of mismatch between base stations and the mobile station in hand-off is controlled and an offset created in a controlled manner that minimizes the net system power required by that user. Thus, some of the adverse consequences that can occur from severe levels of mismatch are reduced, and the advantage of transmitting more power on the dominant base station and less power on the weaker link base stations is also achieved.

More generally, the invention includes a system and method for power control that achieves goals of reducing interference among users, as well as solving the problem of base station forward link transmission power level mismatch for the mobile station that is in hand-off. The base station can periodically adjusts the signal-to-noise threshold value that it transmits to each mobile station or the frame error rate target required with which it is in communication. The signal-to-noise threshold value is then periodically adjusted according to whether it should be reduced or should be increased to maintain a constant frame error rate (e.g., 2%). Once the base station determines that the mobile station is in hand-off and is communicating with another base station, the operation of the base station changes. More specifically, the base station records at least one forward link transmission power level for a specified communication to the mobile station. The base station then transmits the forward link transmission power level for a transmission that was recorded. Additionally, the base station transmits a reverse link signal-to-noise ratio reading from the mobile station that is in hand-off to the base station controller. Thereafter, upon receiving the forward link transmission power level indication from the base station controller, the base station determines whether its forward link transmission power level should be scaled. If so, the base station scales its forward link transmission power level.

According to one embodiment of the present invention, the base station scales its forward link transmission power level as a function of a ratio of its forward link transmission power level to the forward link transmission power level of the selected dominant base station. In another embodiment of the invention, a specific formula for adjusting the forward link transmission power level is implemented. More specifically, the embodiment of the invention includes adjusting the forward link transmission power according to the following formula:

{Adjustment factor+(specified slope factor)*10*(Log [(*BTS* power level)/(dominant *BTS* power level)]}/delay If the formula returns a positive number then the power adjustment is down, if the formula returns a negative number the power adjustment is up.

While the mobile station is not in hand-off, the BTS will merely receive forward link transmission power levels that reflect its own transmission value for a corresponding transmission and, therefore, no scaling occurs. Thus, when the mobile station transitions to a hand-off mode of operation, the BSC will start selecting a dominant BTS from a set of BTSs greater than one thereby enabling the BTSs communicating with the mobile station to determine whether to scale the forward link transmission power level without having to receive any additional signals to trigger additional processing.

Figure 6:
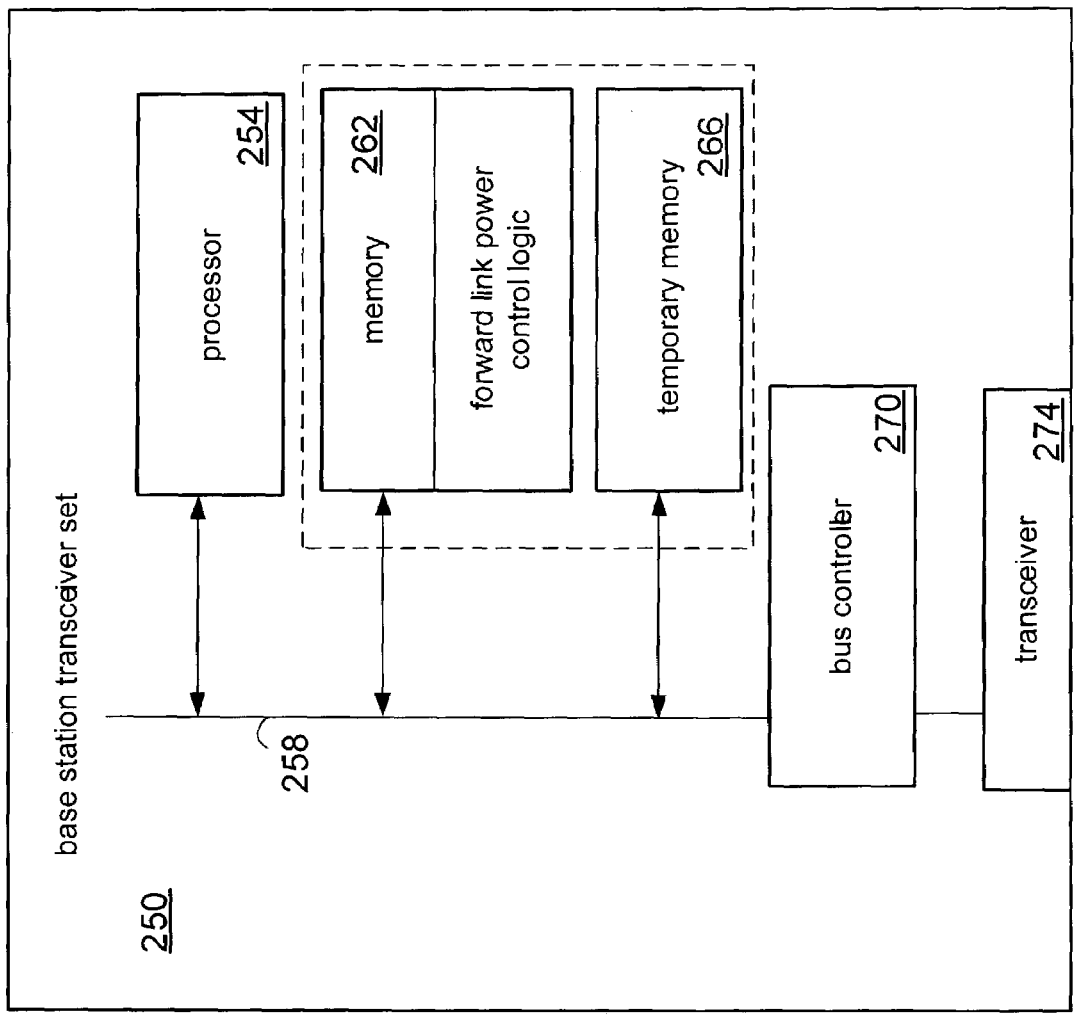
FIG. 6 is a functional block diagram of a base station transceiver system formed according to one embodiment of the present invention.

FIG. 6 is a functional block diagram of a base station transceiver subsystem formed according to one embodiment of the present invention. A base station transceiver subsystem (BTS) 250 includes a processor 254 that is coupled to communicate over a bus 258. A memory 262 further is coupled to bus 258 and is for storing computer instructions that define the operational logic of BTS 250. A temporary memory 266 also is coupled to bus 258 to provide storage of data on a temporary basis for future access while BTS 250 is in an operational mode. Bus 258 further is coupled to a bus controller 270, which controls the communications and timing of communications thereon. Bus controller 270 is further coupled to a transceiver 274 that enables BTS 250 to communicate with external devices.

In operation, processor 254 communicates with memory 262 by way of bus 258 to retrieve computer instructions stored therein and to execute the computer instructions to operate according to the logic defined within the computer instructions of memory 262. Memory 262 specifically includes computer instructions that define the logic for adjusting the forward link transmission power levels as has been described here in this application. Thus, for example, when BTS 250 receives a forward link transmission power level from a base station controller, processor 254 stores that forward link transmission power level within temporary memory 266 and retrieves a corresponding forward link transmission power level also stored within temporary memory 266 to compare the two values to determine if they are equal to each other.

If they are equal, then the logic defined by the computer instructions stored within memory 262 would prompt processor 254 to determine that the forward link transmission power level should not be scaled responsive thereto. If, however, they are not equal, then processor 254 executes computer instructions stored within memory 262 to scale the forward link transmission power level in a manner that is logically defined within the computer instructions of memory 262. More specifically, the computer instructions within memory 262 define logic for scaling the forward link transmission power level according to the following formula:

{Adjustment factor+(specified slope factor)*10*(Log [(*BTS* power level)/(dominant *BTS* power level)]}/delay If the formula returns a positive number then the power adjustment is down, if the formula returns a negative number the power adjustment is up.

The invention disclosed herein is susceptible to various modifications and alternative forms. Specific embodiments therefore have been shown by way of example in the drawings and detailed description. It should be understood that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. A method in a base station transceiver subsystem for adjusting a forward link transmission power level to a mobile station in hand-off between the base station transceiver subsystem and a dominant base station transceiver subsystem in a code division multiple access network, comprising:

receiving a forward link transmission power level of the dominant base station transceiver subsystem to the mobile station in hand-off; and adjusting the forward link transmission power level to the mobile station in hand-off responsive to the forward link transmission power level of the dominant base station transceiver subsystem, wherein adjusting the forward link transmission power level includes:

retrieving a user specified adjustment factor and a user specified slope factor; and calculating a sum of the user specified adjustment factor and a mathematical function that includes a ratio of forward link transmission power levels of the base station transceiver subsystem (BTS) and the dominant BTS, the mathematical function including the user specified slope factor.

2. The method of claim 1 wherein the mathematical function is equal to:

{user specified adjustment factor+(user specified factor) *10*(log[(BTS forward link transmission power level)/(dominant BTS forward link transmission power level)]}/delay.

3. The method of claim 2 wherein the user specified adjustment factor is equal to a value in the range of zero to one.

4. The method of claim 2 wherein the user specified slope factor is equal to a value in the range of zero to one.

5. A base station transceiver subsystem, comprising:
a bus;
a processor coupled to communicate over the bus;

a network port for coupling the base station transceiver subsystem to a wireless communication network to enable the base station transceiver subsystem to communicate with a base station controller; and a memory coupled to the bus, the memory including computer instructions that define logic for:

receiving a forward link transmission power level indication by way of the network port from the base station controller;

determining whether the received forward link transmission power level indication matches a forward link transmission power level for a corresponding forward link transmission power level to a mobile station in hand-off; and if the forward link transmission power levels do not approximately match, adjusting the forward link transmission power level by:

retrieving a user specified adjustment factor and a user specified slope factor, both of which are stored in the memory; and calculating a sum of the user specified adjustment factor and a mathematical function that includes a ratio of forward link transmission power levels of the base station transceiver system (BTS) and a dominant BTS, the mathematical function including the user specified slope factor.

6. The base station transceiver subsystem of claim 5 wherein the computer instructions further define logic for adjusting the forward link transmission power level function is equal to:

user specified adjustment factor+(user specified slope factor)*10*(log[(BTS forward link transmission power level)/(dominant BTS forward link transmission power level)[).

7. The base station transceiver subsystem of claim 5 wherein the computer instructions further define logic for prompting the base station transceiver subsystem to transmit its forward link transmission power level to a base station controller for the mobile station that is in hand-off.

* * * * *